Figure 1:
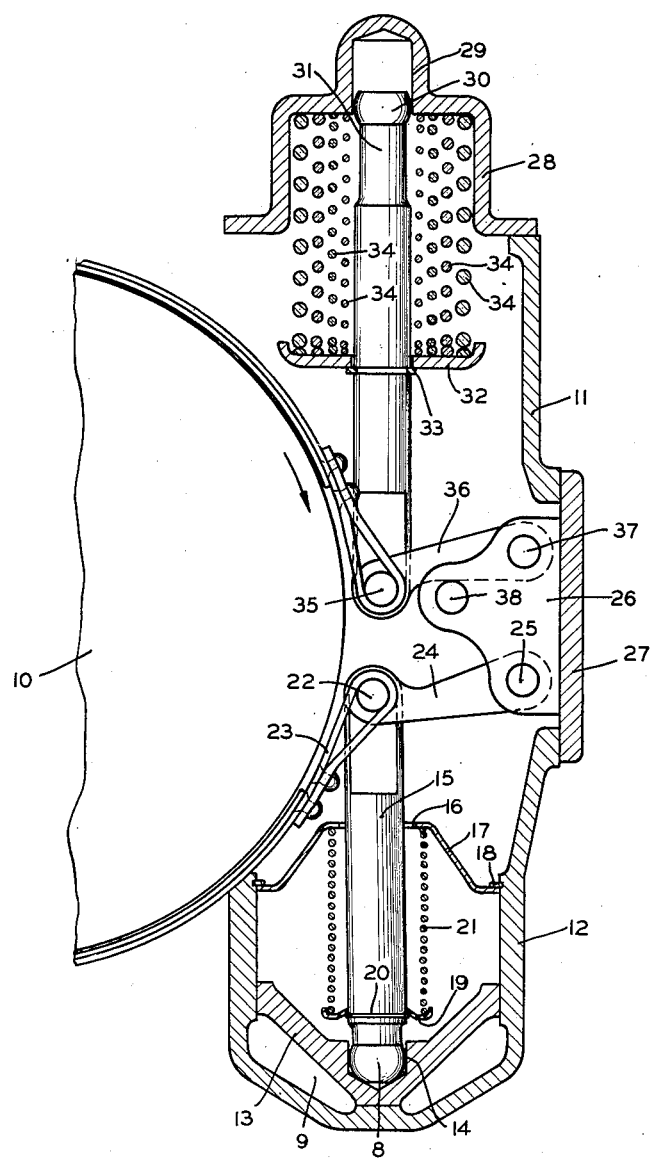

Oct. 20, 1953     R. LAPSLEY     2,656,015
BRAKE CONSTRUCTION
Filed May 10, 1951

INVENTOR.
ROBERT LAPSLEY
BY
ATTYS.

Patented Oct. 20, 1953

2,656,015

UNITED STATES PATENT OFFICE 2,656,015

BRAKE CONSTRUCTION

Robert Lapsley, Buchanan, Mich., assignor to Clark Equipment Company, Buchanan, Mich., a corporation of Michigan Application May 10, 1951, Serial No. 225,642

2 Claims. (Cl. 188—77)

My invention relates generally to brakes, and, more specifically, is directed to a self energizing brake construction operable for braking a rotating drum.

It is an object of my present invention to provide a rotating drum, and, which in addition, effects controlled rotation of the brake drum in a normal direction of rotation of the drum immediately prior to complete release of the brake drum for rotation.

The present brake construction has utility, for example, in a transmission of the character disclosed in my copending application Serial No. 283,176, filed April 19, 1952. In this transmission the brake drum forms part of a ring gear of a planetary gear assembly which ring gear is adapted to be clutched to a shaft by means of an axially shiftable clutch collar member. The clutch collar member is formed with suitable jaw clutch teeth which are adapted to be selectively disposed in engagement with jaw clutch teeth associated with the ring gear. After the brake band of the brake construction has been applied to the ring gear for braking the latter, it frequently happens that the jaw clutch teeth of the clutch collar member are mis-aligned relative to the jaw clutch teeth of the ring gear and thus engagement of the clutch teeth is impossible. In order to permit engagement of the jaw clutch teeth, I have provided a brake construction which will effect controlled rotation of the brake band and ring gear in a normal direction of rotation of the ring gear immediately prior to complete release of the band from braking engagement with the ring gear. This controlled rotation permits the jaw clutch teeth of the clutch collar member to be snapped into engagement with the jaw clutch teeth of the ring gear after which the ring gear may rotate in its normal manner.

The brake construction for accomplishing the above object comprises a brake band encircling the ring gear and having adjacent free ends. Spring means is associated with one of the ends for normally biasing the latter toward the other end of the brake band. Means, which in the specific embodiment of my invention comprises fluid actuated means, is associated with the other end of the brake band and is adapted when actuated to urge the other end of the brake band toward the one end against the force of the spring means whereby the brake band is contracted for braking the ring gear. The deflection of the spring means will cause the brake band assembly to rotate a controlled amount opposite to the normal direction of the brake drum rotation. Upon release of the fluid actuated means, the spring means simultaneously effects controlled rotation of the brake band and ring gear in normal direction of rotation of the ring gear immediately prior to complete release of the band from braking engagement with the ring gear. It will be understood that the brake construction of my present invention has utility with brake drums other than in the form of ring gears, this illustration being given by way of exemplification and not limitation.

Now, in order to acquaint those skilled in the art with the manner of constructing and using the device of my present invention, I shall describe in connection with the accompanying drawing, a preferred embodiment of my invention.

In the drawing:

Figure 1 is a vertical sectional view of the brake construction of my present invention.

Referring now to the drawing, there is shown a brake drum 10 which, may, for example, form part of a ring gear of a planetary assembly as is shown in detail in my copending application Serial No. 283,176, filed April 19, 1952. Disposed adjacent the brake drum 10 is a housing member 11 which has a cylindrical portion 12 closed at its lower end. Mounted for reciprocating movement within the cylinder portion 12 is a piston 13. A fluid chamber 9 is formed between the piston 13 and the closed end of the cylindrical portion 12. The piston 13 is formed with a central opening 14 which receives the generally spherically shaped lower end 8 of a vertically extending rod member 15. The rod member 15 intermediate of its ends projects through a central opening 16 formed in a member 17 which is maintained in the cylindrical portion 12 by means of a retaining ring 18 suitably mounted in the cylindrical portion 12.

A spring carrier 19 is disposed about the rod member 15 adjacent its lower end and downward movement of the spring carrier 19 relative to the rod member 15 is limited by a retaining ring 20 secured in the rod member 15. A spring 21 is disposed concentrically about the rod member 15. The upper end of the spring 21 abuts against member 17 and at its lower end abuts against the spring carrier 19. The spring 21 normally biases the rod member 15 together with the piston 13 to the position shown in Figure 1.

The upper end of the rod member 15 has secured thereto a pin member 22 on which is secured the one end of a brake band 23 which encircles the brake drum 10. Also pivotally mounted to the pin member 22 is the one end of a lever 24. The other end of the lever 24 is pivotally mounted at 25 to a plate member 26 suitably secured to a closure plate 27 secured to the housing member 11.

A stepped cover member 28 is suitably secured to the upper end of the housing member 11 and the cover member 28 has a central opening 29 formed therein, which is adapted to receive the generally spherically shaped upper end 30 of a rod member 31. The axis of rod member 31 is substantially aligned with the axis of the rod member 15. A spring carrier 32 is disposed concentrically about the rod member 31 and is restrained against axial movement in a downward direction relative to rod 31 by means of a retaining ring 33 suitably fixed in the rod member 31. A plurality of springs 34 are disposed concentrically about the rod member 31. The springs 34 at their upper ends abut the cover member 28 and at their lower ends abut the spring carrier 32 for normally biasing the rod member 31 downwardly as viewed in Figure 1.

The lower end of the rod member 31 has secured therein a pin member 35 upon which is mounted the other end of the aforementioned brake band 23. Also pivotally mounted on the pin member 35 is the one end of a lever 36. The other end of the lever 36 is pivotally mounted at 37 to the aforementioned plate member 26.

A pin member 38 is suitably mounted in the plate member 26 and is adapted to provide a stop for the lever 36. It will thus be seen that downward movement of the rod member 31 is limited by the engagement of the lever 36 with the pin member 38 as shown in Figure 1.

With the various elements of the brake assembly disposed in the position shown in Figure 1, the brake band 23 is in a released or non-braking position and the brake drum 10 is free to rotate. Upon the selective admission of fluid under pressure to the chamber 9 the piston 13, together with the rod member 15, is forced upwardly which places a counterclockwise tension on the brake band 23 causing the latter to be applied to the brake drum 10. If the brake drum 10 is rotating in clockwise direction as indicated by the arrow, the counterclockwise tension on the brake band 23 will increase as the latter initially engages the drum 10, since the band 23 will tend to rotate opposite the drum 10. It will thus be apparent that the brake construction is self-energizing in one direction of rotation and increases the ability of the springs 34 to brake the drum 10.

The counterclockwise tension applied to the brake band 23 will cause the rod member 31 to be urged upwardly against the downwardly biasing force of the plurality of springs 34 which in turn causes the crank arm 36 to be rotated clockwise from the position shown in Figure 1 to a position out of contact with the pin member 38.

If fluid under pressure is now bled from the fluid chamber 9, the piston 13, together with the rod member 15, will be urged downwardly under the biasing force of spring 21 which will finally release the counterclockwise tension on the brake band 23. Simultaneously, the downwardly biasing force of the plurality of springs 34 and the rotative force of drum 10 will urge the rod member 31 downwardly until the crank arm 36 engages the pin member 38. During this downward movement of the rod member 31, a clockwise rotation is applied to the brake band 23 which causes controlled rotation of the brake drum 10 in a clockwise direction immediately prior to complete release of the band 23 from braking engagement with the drum 10. After the brake band 23 has been fully released from engagement with the brake drum 10, the elements of the brake construction assume the position shown in Figure 1 and the drum 10 is again free to rotate.

The spherical ends 8 and 30 of the rod members 15 and 31 permit limited pivotal movement of the rod members 15 and 31 during movement of the latter when the brake band 23 is applied to the drum 10 or released therefrom.

Now, while I have shown and described what I believe to be a preferred embodiment of my invention, it will be understood that various modifications and rearrangements may be made therein without departing from the spirit and scope of my invention.

I claim:

1. Brake means comprising a brake drum, a brake band encircling said drum and having adjacent free ends, a pair of levers pivotally mounted at their one ends one to each of the said free ends of said band, said levers at their other ends having fixed pivotal anchors, a pair of substantially aligned rod members pivotally mounted at their one ends one to each of the said free ends of said band, spring means associated with one of said rod members for normally biasing the latter toward the other of said rod members, and means associated with the other of said rod member which means is adapted when actuated to urge the said other rod member toward the said one rod member against the force of said spring means whereby said brake band is contracted for braking said drum and rotating the latter a controlled amount in a direction opposite to the normal direction of rotation of said brake drum.

2. Brake means comprising a brake drum, a brake band encircling said drum and having adjacent free ends, a housing, a pair of levers pivotally mounted at their one ends one to each of the said free ends of said band, said levers at their other ends being pivotally mounted to said housing, a pair of rod members pivotally mounted at their one ends one to each of the said free ends of said band, coil spring means disposed concentrically about one of said rod members between the latter and said housing for normally biasing the said one rod member toward the other of said rod members, stop means carried by said housing for limiting movement of said one rod member toward said other rod member, fluid pressure actuated means associated with the other of said rod members which means is adapted when actuated to urge the said other rod member toward the said one rod member against the force of said coil spring means whereby the latter is partially compressed and said brake band is contracted for braking said drum and rotating the latter a controlled amount in a direction opposite to the normal direction of rotation of said brake drum, and said coil spring means when said fluid pressure actuated means is released being adapted to expand whereby said band and said drum are rotated a controlled amount in the normal direction of rotation of said drum immediately prior to complete release of said band from braking engagement with said drum.

ROBERT LAPSLEY.

References Cited in the file of this patent

UNITED STATES PATENTS

| Number | Name | Date |
|---|---|---|
| 2,087,810 | Oliver | July 20, 1937 |
| 2,127,030 | Hodges | Aug. 16, 1938 |
| 2,361,935 | French | Nov. 7, 1944 |

FOREIGN PATENTS

| Number | Country | Date |
|---|---|---|
| 498,588 | Great Britain | July 10, 1939 |